Oct. 6, 1964     M. C. HESSE     3,151,645
BREAKER AND SHREDDING CYLINDER FOR EAR CORN
Filed Dec. 12, 1962     2 Sheets-Sheet 1
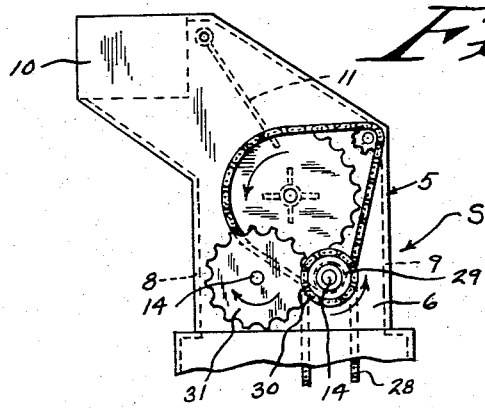
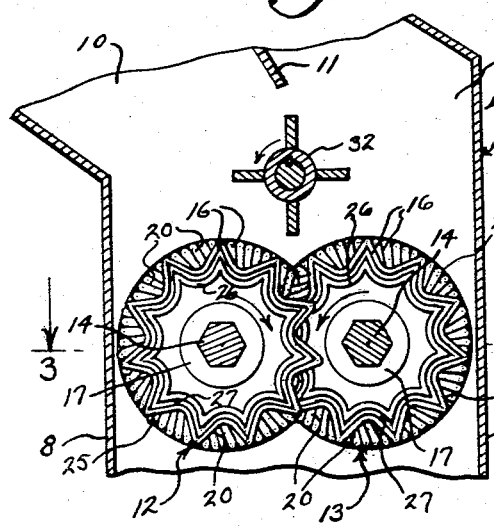
INVENTOR
MYRON C. HESSE
BY *Wright Wright*
ATTORNEYS

INVENTOR
MYRON C. HESSE

BY *Wright & Wright*

ATTORNEYS 3,151,645
Patented Oct. 6, 1964

3,151,645
BREAKER AND SHREDDING CYLINDER
FOR EAR CORN
Myron C. Hesse, Pender, Nebr.
Filed Dec. 12, 1962, Ser. No. 244,115
1 Claim. (Cl. 146—71)

This invention appertains to a new corn crushing machine, and more particularly to a mechanism for facilitating and insuring the proper, fast crushing, breaking and shredding of ear corn including the cobs, husks and kernels incident to the preparation of feed for livestock.

I have heretofore proposed to use crushing cylinders embodying interfitted shredding discs, with the corn fed between the discs. Such cylinders and their discs tend to jam with parts of the material adhering between the adjacent faces of the discs and the discs failed to finely cut and properly shred and crush the corn.

One of the primary objects of my present invention is to provide novel crushing and shredding discs embodying external and internal cutting edges, or more specifically, outer cutting edges on their opposite sides of the rims and inner spaced cutting edges on their opposite side faces, whereby the corn will be subjected to a dual cutting action, with the inner cutting edges effectively functioning to shred the corn passing between the side faces of the interfitting discs of the shredding cylinders.

A further prime object of the invention is to provide the discs with a novel tooth arrangement whereby the discs can be mounted in such a manner on their shafts that diagonally extending peripheral channels will be provided to give a progressive shearing, cutting action, functioning like scissors to cut the cob and fiber material into small particles.

A further prime object of the invention is to provide novel means for forming the cylinder shafts and the toothed shredding discs whereby the discs can be quickly mounted on the shaft without cumbersome keys and keyways and whereby the desired diagonally extending peripheral shearing channels can be had.

A still further important object of my invention is to provide a polygonal cylinder shaft having an even number of equal sides (6), and shredding discs having an uneven number (11) of shredding teeth, whereby as the discs are slid on their shafts during assembly each succeeding disc can be turned a part of a circle (sixty degrees), to stagger the teeth of the disc and bring about desired diagonally extending peripheral channels.

With these and other objects in view, the invention consists in the novel construction, arrangement and formation of parts, as will be hereinafter more specifically described and claimed, and illustrated in the accompanying drawings, in which drawings, FIGURE 1 is a side elevational view of my improved shredding cylinder corn crusher or head;

FIGURE 2 is a fragmentary vertical sectional view through the crusher and shredder taken on the line 2—2 of FIGURE 3, looking in the direction of the arrows;

FIGURE 3 is a horizontal sectional view taken substantially on the line 3—3 of FIGURE 2, looking in the direction of the arrows, the view showing the breaking and shredding cylinders in plan, and the arrangement of their shredding discs, to form the diagonally extending peripheral channels;

Figure 4:
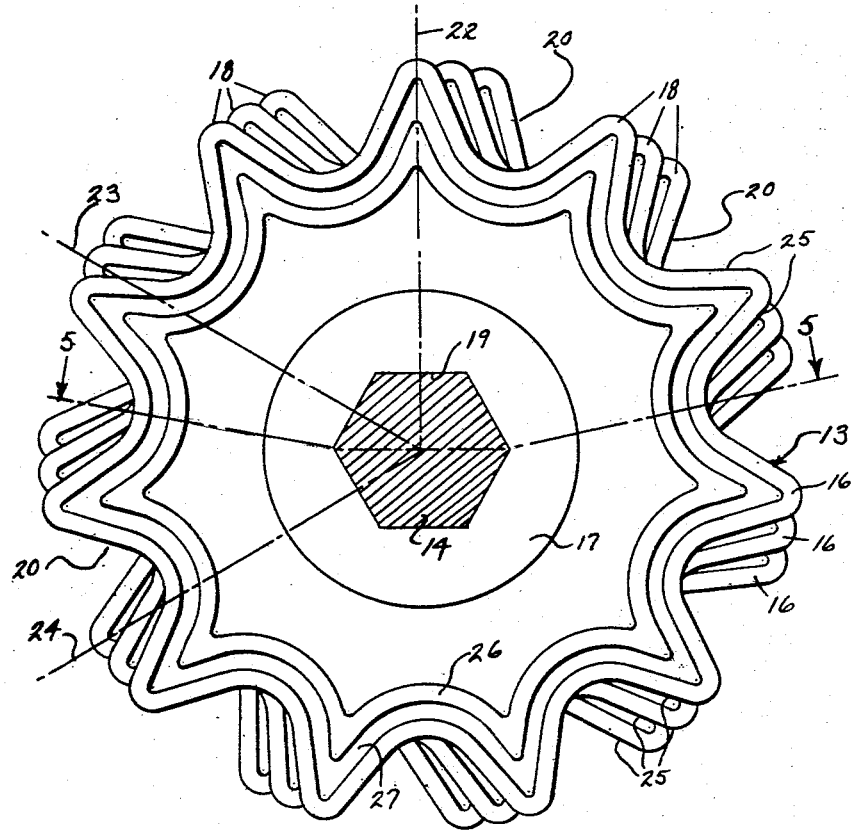
Figure 5:
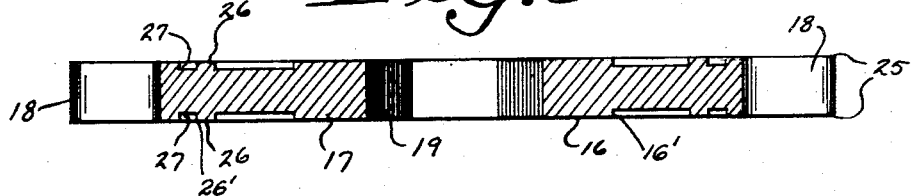

FIGURE 4 is a sectional view on an enlarged scale through one of the crushing and shredding cylinders showing one of my improved shredding discs in side elevation, the view also showing the novel staggering of the teeth of adjacent discs by the mere progressive turning of each succeeding disc on the shaft during the assembly of the disc on the shaft, and FIGURE 5 is a transverse sectional view through the improved shredding and breaking disc taken on the line 5—5 of FIGURE 4, looking in the direction of the arrows.

Referring to the drawings in detail, wherein similar reference characters designate corresponding parts throughout the several views, the letter S generally indicates the improved shredding cylinder corn crusher or head.

This head S includes a casing 5 fabricated in any desired manner. The casing includes side walls or plates 6 and 7 and end walls or plates 8 and 9. The upper end of the casing 5 terminates in a laterally extending hopper or feed chute 10. The flow of corn through the hopper or chute 10 can be regulated by a pivoted gate 11.

Arranged within the casing 5 are the improved breaking and crushing cylinders 12 and 13. Each of the cylinders includes a shaft 14 rotatably mounted in bearings 15 carried by the side walls 6 and 7 of the casing 5. Non-rotatably mounted on the shafts 14 are a plurality of equidistantly spaced toothed shredding discs 16. The shredding cylinders 12 and 13 including their shafts 14 and the discs 16 are of a novel construction and arrangement and form an important feature of this present invention.

Each disc 16 includes a hub plate 17 having projecting therefrom a plurality of radially extending teeth 18. The axial center of each hub plate is provided with an axial bore 19 of a polygonal shape. The bore 19 of each disc 16 corresponds to the exact shape of its cylinder shaft and hence each cylinder shaft is of a polygonal shape in cross-section. Particular attention is called to the fact that each shaft has an equal number of sides and in this instance, six sides. The shredding discs 16 each have an unequal number of teeth 18 and in this instance eleven. In assemblying the cylinders, the discs are slid endwise on their respective shafts and each successive disc is turned a sixth of a revolution or sixty degrees, so that the teeth of each succeeding disc will be staggered relative to the next disc, so that diagonally extending peripheral channels 20 will be provided in the cylinders 12 and 13. The discs of one cylinder interfit between the discs of the other cylinder and the interfitting of the discs of the cylinders in conjunction with the diagonally extending peripheral channels 20 brings about a desired progressive cutting, shearing action and this facilitates the breaking up and shredding of the ear corn.

Attention is also directed to the fact that the discs 16 of cylinder 12 are held in their spaced relationship by collars 21 placed on the cylinder shaft between the discs. The discs 16 of cylinder 13 are held spaced on their shaft by interfitting between the discs of cylinder 12 and no spacing collars are utilized, for the cylinder 13. Thus, the discs 16 of cylinder 13 are free to float longitudinally on their shaft. This floating action also functions to prevent the jamming up of the cylinders by corn and also facilitates the cutting action of the discs. At this time, it can be noted again, that the discs are of a special construction and of a construction not only to provide peripheral cutting edges but also side cutting edges as will be later set forth.

Again referring to the staggering of the teeth of each succeeding disc, the line indicated by the reference character 22 in FIGURE 4, indicates a position of one tooth of a first shredding disc and it is to be noted that the center line of this tooth is at direct right angles to one face of its cylinder shaft. The line 23 indicates the position of a tooth of a second plate and line 24 indicates a position of a tooth of a third plate. Again, the position of these teeth is brought about by the shape of the polygonal shaft having an even number of sides and the shape of the disc having an uneven number of teeth.

Now referring to the cutting edges of the disc it can be seen that the opposite peripheral edges of the teeth and disc are provided with peripheral cutting edges 25. Formed on the opposite faces of each hub plate 17 is is a rib 26 arranged in spaced relation to the peripheral edge of its disc and each rib is shaped exactly the same as the toothed periphery of the disc. The raised rib 26 on each face of the disc defines a channel 27 between itself and the peripheral edge of the disc. These ribs also define side face cutting edges 26. In actual practice, it has been found that the inner and outer edges of the discs and their teeth define two cutting edges 16' and that the inner and outer edges of the ribs 26 also define two cutting edges 26'. Thus, in effect, each disc is provided with four cutting edges. In all event, during the rotation of the discs a dual cutting action is had, namely, a cutting action at the periphery of the disc and a cutting action on the opposite sides of the disc.

The cylinders 12 and 13 can be rotated in any preferred manner, but the cylinders are rotated inwardly toward one another, and in the direction of the arrows shown in FIGURE 1. It is also preferred to run one cylinder at a higher rate of speed than the other and this tends to bring the corn between the cylinders in an even steady flow, and such even, steady flow material reduces vibration of the machine. As illustrated, the shaft 14 of cylinder 13 is driven by a sprocket chain 28 which leads from any suitable source of power. The opposite end of this shaft is provided with sprocket wheels 29 having wound thereabout a sprocket chain 30. Meshing with the sprocket chain 30 is a sprocket wheel 31 of a greater diameter than the sprocket wheels 29. This wheel 31 is keyed, or otherwise secured, to the shaft 14 of the crushing and shredding cylinder 12.

If desired, a pre-breaker and feeder wheel 32 can be rotatably mounted in the casing above and directly between the shredding cylinders 12 and 13. This pre-breaker and feeding wheel 32 can be driven from the shaft 14 of cylinder 13, in any preferred way.

From the foregoing description, it can be seen that I have provided a set of novel shredding and breaking discs having a plurality of cutting edges and that novel means is provided for mounting these discs on their shafts whereby to bring about the staggering of the teeth of the discs.

It is to be also noted that the means employed for mounting the discs on their respective shafts is of such an order that the formation of keys and keyways is eliminated.

Changes in details may be made without departing from the spirit or the scope of this invention, but what I claim as new is:

A shredder and crusher for ear corn comprising a casing, a pair of facing parallel crushing and shredding cylinders arranged within the casing and extending the full width thereof, and means for rotating the cylinders in opposite directions but downwardly toward each other, each of said cylinders including a rotatable shaft and a plurality of spaced shredding plates, said shaft being of a polygonal shape in cross-section and having an equal number of sides, the plates of one cylinder being interfitted between the plates of the other cylinder, each of said plates including a hub disc and a plurality of radially extending teeth, said teeth being of an unequal number, each of said hub discs having an axial polygonal bore of the exact shape of the transverse configuration of the shaft so that, when said plates are fitted on the shaft the same will rotate therewith, each succeeding plate being turned relative to an adjacent plate a distance equal to one side of the shaft, whereby the teeth of the plates will be arranged slightly in advance of an adjacent plate forming diagonally extending peripheral channels, said plates being provided with peripheral and side cutting edges, collars on one of said shafts and disposed between the plates on said shaft for holding said plates equidistantly spaced and against longitudinal shifting movement, and the plates on the other of said shafts being mounted for sliding movement on their shaft to bring about a floating action.

References Cited in the file of this patent
UNITED STATES PATENTS

| | | |
|---|---|---|
| 863,067 | Holland-Letz | Aug. 13, 1907 |
| 1,042,932 | Leonard | Oct. 29, 1912 |
| 1,477,502 | Killick | Dec. 11, 1923 |
| 2,208,040 | Moeller | July 16, 1940 |